(12) United States Patent
Zhou et al.

(10) Patent No.: US 12,167,330 B2
(45) Date of Patent: Dec. 10, 2024

(54) WAKE-UP METHOD AND APPARATUS, STORAGE MEDIUM AND TERMINAL

(71) Applicant: SPREADTRUM COMMUNICATIONS (SHANGHAI) CO., LTD., Shanghai (CN)

(72) Inventors: Huayu Zhou, Shanghai (CN); Yin Yang, Shanghai (CN); Kai Zhang, Shanghai (CN); Cheng Wang, Shanghai (CN); Xingya Shen, Shanghai (CN); Meng Zhang, Shanghai (CN); Zhengang Pan, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 373 days.

(21) Appl. No.: 17/568,808

(22) Filed: Jan. 5, 2022

(65) Prior Publication Data
US 2022/0132422 A1      Apr. 28, 2022

Related U.S. Application Data

(63) Continuation of application No. PCT/CN2020/086030, filed on Apr. 22, 2020.

(30) Foreign Application Priority Data

Jul. 5, 2019   (CN) .......................... 201910604549.4

(51) Int. Cl.
*H04W 48/12*      (2009.01)
*H04W 52/02*      (2009.01)
(Continued)

(52) U.S. Cl.
CPC .... *H04W 52/0229* (2013.01); *H04W 72/1273* (2013.01); *H04W 76/28* (2018.02)

(58) Field of Classification Search
None
See application file for complete search history.

(56) References Cited

U.S. PATENT DOCUMENTS

2017/0318620 A1*  11/2017  Tseng ........................ H04L 1/08
2018/0368164 A1*  12/2018  Lunden .................. H04W 76/28
(Continued)

FOREIGN PATENT DOCUMENTS

| CN | 109219116 A | 1/2019 |
| CN | 109496446 A | 3/2019 |

(Continued)

OTHER PUBLICATIONS

Hisilicon, "Discussion on the impact of WUS to the C-DRX", 3GPP TSG-RAN2 Meeting#106, R2-1906903; May 13-17, 2019; 5 pages.
(Continued)

*Primary Examiner* — Ajit Patel
(74) *Attorney, Agent, or Firm* — CANTOR COLBURN LLP

(57) ABSTRACT

A wake-up method and apparatus, a storage medium and a terminal are provided. The method includes: monitoring a wake-up Physical Downlink Control Channel (PDCCH); if detecting the wake-up PDCCH, determining to enter a wake-up mode; or if detecting the wake-up PDCCH, and wake-up indication information in Downlink Control Information (DCI) transmitted by the wake-up PDCCH indicates to enter the wake-up mode, determining to enter the wake-up mode, wherein entering the wake-up mode comprises starting an onDurationTimer and/or starting a drx-Inactivity-Timer.

18 Claims, 2 Drawing Sheets a UE monitors a wake-up PDCCH — S101 if detecting the wake-up PDCCH, the UE determines to enter a wake-up mode; or if detecting the wake-up PDCCH, and wake-up indication information in DCI transmitted by the wake-up PDCCH indicates to enter the wake-up mode, the UE determines to enter the wake-up mode, wherein entering the wake-up mode includes starting an onDurationTimer and/or starting a drx-InactivityTimer — S102

(51) Int. Cl.
*H04W 72/1273* (2023.01)
*H04W 76/28* (2018.01)

(56) References Cited

U.S. PATENT DOCUMENTS

| | | | |
|---|---|---|---|
| 2019/0059129 A1 | 2/2019 | Luo et al. | |
| 2019/0297577 A1* | 9/2019 | Lin | H04W 52/0229 |
| 2020/0092805 A1* | 3/2020 | Zhang | H04W 52/0229 |
| 2020/0205076 A1 | 6/2020 | Chen et al. | |
| 2020/0214078 A1 | 7/2020 | Jiang et al. | |
| 2021/0243694 A1 | 8/2021 | Li | |
| 2021/0306952 A1 | 9/2021 | Kuang et al. | |
| 2022/0217635 A1* | 7/2022 | Lee | H04W 72/0446 |

FOREIGN PATENT DOCUMENTS

| | | | | |
|---|---|---|---|---|
| CN | 109511157 A | 3/2019 | | |
| CN | 109644459 A | 4/2019 | | |
| CN | 111432460 B | * 12/2023 | | H04B 7/0413 |
| IN | 109429310 A | 3/2019 | | |
| WO | 2018210135 A1 | 11/2018 | | |

OTHER PUBLICATIONS

Intel Corporation, "Considerations on PDCCH-based power saving signal", 3GPP TSG-RAN WG1 #97, R1-1906819; May 13-17, 2019; 11 pages.

International Seach Report for International Application No. PCT/CN2020/086030; Date of Mailing; Jul. 14, 2020.

OPPO, "Impacts of PDCCH-based wake up signalling", 3GPP TSG-RAN WG2 Meeting #106, R2-1905603; May 13-17, 2019; 6 pages.

Qualcomm Incorporated, "PDCCH-based power saving channel design", 3GPP TSG-RAN WG1 #97, R1-1907294; May 13-17, 2019; 16 pages.

Samsung, "PDCCH-based power saving signal/channel", 3GPP TSG RAN WG1 #97, R1-1906980; May 13-17, 2019; 12 pages.

\* cited by examiner

WAKE-UP METHOD AND APPARATUS, STORAGE MEDIUM AND TERMINAL

CROSS-REFERENCE TO RELATED APPLICATIONS

This application is a continuation application under 35 U.S.C. § 120 of International Application No. PCT/CN2020/086030, filed on Apr. 22, 2020, which is incorporated herein by reference and which claimed priority to Chinese Patent Application No. 201910604549.4, filed on Jul. 5, 2019, the entire content of which is also incorporated herein by reference.

TECHNICAL FIELD

The present disclosure generally relates to communication technology field, and more particularly, to a wake-up method and apparatus, a storage medium and a terminal.

BACKGROUND

Generally, a UE in a connected state monitors a Physical Downlink Control Channel (PDCCH) merely in an active time of Discontinuous Reception (DRX) based on configuration of DRX or configuration of Extended Discontinuous Reception (eDRX). This allows the UE to sleep periodically, thereby saving power of the UE. The active time generally includes a running time of a timer such as onDurationTimer, drx-InactivityTimer, drx-RetransmissionTimer, drx-RetransmissionTimerShortTTI, drx-ULRetransmissionTimer, drx-ULRetransmissionTimerShortTTI or mac-ContentionResolutionTimer.

In some scenarios, such as scenarios where a packet arrival rate is low or where network congestion exists, for a given UE, no data is scheduled within a certain DRX cycle, while the UE still monitors a PDCCH in the DRX cycle, causing additional power consumption. In this case, a base station may instruct the UE not to monitor the PDCCH during the DRX cycle via Go-To-Sleep (GTS) signaling. The GTS signaling may be a Media Access Control (MAC) layer command. For example, the base station may instruct the UE to stop onDurationTimer via MAC Packet Data Unit (PDU) or MAC Control Element (CE).

The narrowband system has few time-frequency resources. If the UE is instructed to enter a sleep mode through the MAC layer command, it needs to consume PDCCH and Physical Downlink Shared Channel (PDCCH) resources. Transmitting GTS signaling via PDCCH is a possible solution, where the GTS signaling is preferably carried in a scheduling PDCCH, so that there is no need to additionally transmit a PDCCH for the GTS signaling. This is particularly applicable to narrowband systems, as there are few time and frequency resources (accordingly, also few PDCCH resources) in the narrowband systems. In summary, at least for narrowband systems, GTS signaling is suitable for situations where a small amount of data is scheduled in DRX cycles. Besides, a base station may wake up UEs by transmitting WakeUp Signaling (WUS) before the DRX cycles. The Wake-up signaling is more suitable for situations where no data is scheduled in the DRX cycles.

SUMMARY

In embodiments of the present disclosure, wake-up signaling may be optimized in a narrowband system.

In an embodiment of the present disclosure, a wake-up method is provided, including: monitoring a wake-up PDCCH; if detecting the wake-up PDCCH, determining to enter a wake-up mode; or if detecting the wake-up PDCCH, and wake-up indication information in Downlink Control Information (DCI) transmitted by the wake-up PDCCH indicating to enter the wake-up mode, determining to enter the wake-up mode, wherein entering the wake-up mode includes starting an onDurationTimer and/or starting a drx-InactivityTimer.

Optionally, said monitoring the wake-up PDCCH includes: monitoring the wake-up PDCCH before a default start time of the onDurationTimer; or monitoring the wake-up PDCCH outside active time and before the default start time of the onDurationTimer.

Optionally, the default start time of the onDurationTimer is a frame number or a subframe number at which the onDurationTimer is started by default.

Optionally, said monitoring the wake-up PDCCH before a default start time of the onDurationTimer includes: monitoring the wake-up PDCCH on a frame or a subframe that has an offset of X subframes or X frames from the default start time of the onDurationTimer, where X is an integer.

Optionally, the offset of X subframes or X frames is configured via high-layer signaling.

Optionally, resource configuration for the wake-up PDCCH is determined via high-layer signaling, and includes at least one of a start carrier index, a number of carrier bundlings, or a number of repetitions.

Optionally, said monitoring the wake-up PDCCH includes: monitoring a PDCCH in a common search space, and descrambling the monitored PDCCH using a new Radio Network Temporary Identity (RNTI); and if the descrambling succeeds, determining that the wake-up PDCCH is detected.

Optionally, the wake-up indication information includes a bit in a corresponding position of a UE on a bitmap.

Optionally, a number of bits of the wake-up indication information is configured via a high-layer signaling, and is 30 or 56.

Optionally, the wake-up indication information includes an identity of a UE to enter the wake-up mode.

Optionally, the identity of the UE is an index or a number of the UE.

Optionally, a DCI format of the wake-up PDCCH is a DCI format used to schedule a PDSCH.

Optionally, the DCI format used to schedule the PDSCH includes a DCI format used to schedule a non-broadcast PDSCH.

Optionally, a size of the DCI is 56 bits.

Optionally, the DCI format used to schedule the PDSCH includes a DCI format used to schedule a broadcast PDSCH.

Optionally, a size of the DCI is 30 bits.

Optionally, a base station enables monitoring of the wake-up PDCCH via high-layer signaling.

Optionally, the method further includes: if not detecting the wake-up PDCCH, determining to enter the wake-up mode.

Optionally, the method further includes: if determining to enter the wake-up mode, entering the wake-up mode after a configuration start time.

Optionally, the configuration start time is a number of subframes or slots.

Optionally, the configuration start time is determined via high-layer signaling.

Optionally, the configuration start time is determined via the DCI.

Optionally, the configuration start time is determined by an index of the configuration start time which is indicated by the DCI, where the index of the configuration start time is an index or number of a plurality of candidate start times configured by high-level signaling.

In an embodiment of the present disclosure, a storage medium having computer instructions stored therein is provided, wherein when the computer instructions are executed, the wake-up method is performed.

In an embodiment of the present disclosure, a UE including a memory and a processor is provided, wherein the memory has computer instructions stored therein, and when the processor executes the computer instructions, the wake-up method is performed.

DETAILED DESCRIPTION

In narrowband systems, there are few time and frequency resources, which needs to be taken into account during design of wake-up signaling. The wake-up signaling in narrowband systems needs to be optimized.

In embodiments of the present disclosure, a wake-up PDCCH is monitored. If detecting the wake-up PDCCH, or if obtaining wake-up indication information from DCI transmitted by the wake-up PDCCH, the UE is controlled to enter the wake-up mode. On one hand, user power consumption in scenarios where no data is scheduled may be reduced; on the other hand, using PDCCH to instruct UEs to enter the wake-up mode may save time and frequency resources.

The embodiments of the present disclosure are applicable to 5G communication systems, 4G and 3G communication systems, and various new communication systems in the future, such as 6G and 7G communication systems.

In order to clarify the objects, characteristics and advantages of the disclosure, embodiments of present disclosure will be described in detail in conjunction with accompanying drawings.

Figure 1:
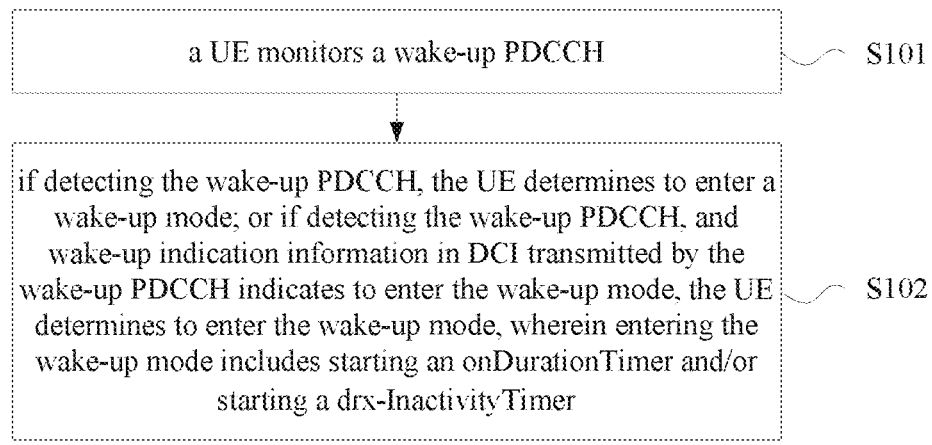
FIG. 1 is a flow chart of a wake-up method according to an embodiment.

FIG. 1 is a flow chart of a wake-up method according to an embodiment.

The method provided in the embodiment may be applied at a UE side. That is, the UE may perform the method as shown in FIG. 1. The method may include S101 and S102.

In S101, a UE monitors a wake-up PDCCH.

In S102, if detecting the wake-up PDCCH, the UE determines to enter a wake-up mode; or if detecting the wake-up PDCCH, and wake-up indication information in DCI transmitted by the wake-up PDCCH indicates to enter the wake-up mode, the UE determines to enter the wake-up mode, wherein entering the wake-up mode includes starting an onDurationTimer and/or starting a drx-InactivityTimer.

It should be noted that, sequence numbers of steps in the embodiments of the present disclosure do not limit an execution order of the steps.

In some embodiments, the UE may be located within a narrowband system, and a base station configures a semi-static DRX cycle for the UE in a connected state.

In some embodiments, the UE receives and monitors the PDCCH, and determines whether the monitored PDCCH is a wake-up PDCCH. The wake-up PDCCH may be a PDCCH where transmitted DCI carries wake-up indication information, or a PDCCH that is descrambled by using an RNTI different from that used for descrambling an original PDCCH. The wake-up indication information refers to information that can be used to indicate whether the UE enters the wake-up mode. The UE entering the wake-up mode means that the UE is capable of starting an onDurationTimer and/or starting a drx-InactivityTimer.

In some embodiments, in S101, the UE may monitor the wake-up PDCCH before a default start time of the onDurationTimer; or monitor the wake-up PDCCH outside active time and before the default start time of the onDurationTimer. In this way, PDCCH scheduling occasions for the UE to monitor are not reduced, and the opportunity for the UE to be scheduled is not reduced. The default start time of the onDurationTimer is a frame number or a subframe number at which the onDurationTimer is started by default. The UE determines the frame number or the subframe number based on high-layer parameters, such as a DRX cycle (drx-Cycle) and a DRX start position (drxStartOffset).

In some embodiments, when SFN mod (drx-Cycle) =drxStartOffset, a current frame number is the frame number at which the onDurationTimeris started by default, where SFN (System frame number) is the current frame number, mod is a modulo or remainder operation, and A mod B is a remainder of A divided by B.

In some embodiments, when [(HFN×1024)+SFN] mod (drx-Cycle)=drxStartOffset, a current frame number is the frame number at which the onDurationTimer is started by default, where ((HFN×1024)+SFN) is the current frame number, HFN is a Hyper frame number. The UE monitoring the wake-up PDCCH before the default start time of the onDurationTimer includes: monitoring the wake-up PDCCH on a frame or a subframe that has an offset of X subframes or X frames from the default start time of the onDurationTimer. The offset of X subframes or X frames is configured via high-layer signaling, such as a wake-up offset (drx-WakeupOffset). Through the offset, multiple UEs can tune radio frequency and monitor the wake-up PDCCH in a common search space before the default start time of the onDurationTimer. If detecting that it needs to enter the wake-up mode, a particular UE re-tunes the radio frequency so as to monitor a scheduling PDCCH within a start time of the onDurationTimer.

In some embodiments, when [SFN+drx-WakeupOffset] mod (drx-Cycle)=drxStartOffset, a current frame number is a frame number at which the UE monitors the wake-up PDCCH, where SFN is the current frame number.

In some embodiments, when [(HFN×1024)+SFN+drx-WakeupOffset] mod (drx-Cycle)=drxStartOffset, the current frame number is a frame number at which the UE monitors the wake-up PDCCH, where ((HFN×1024)+SFN) is the current frame number.

The UE determines resource configuration of the wake-up PDCCH based on high-layer signaling, and the resource configuration of the wake-up PDCCH includes at least one of a start carrier index, a number of carrier bundlings, or a number of repetitions. Alternatively, the resource configuration of the wake-up PDCCH includes a start carrier index, a number of carrier bundlings, or a number of repetitions. The base station may configure that multiple UEs share the same resource configuration of wake-up PDCCH, so that the multiple UEs monitor the same wake-up PDCCH.

It should be noted that the frame in the embodiments may be a radio frame, and the frame number may be a radio frame number.

In some embodiments, after the wake-up PDCCH is detected in S101, in S102, whether to enter the wake-up mode may be determined based on the wake-up indication information in the wake-up PDCCH or in the DCI transmitted by the wake-up PDCCH. Specifically, entering the wake-up mode may include starting the onDurationTimer and/or starting the drx-InactivityTimer.

In embodiments of the present disclosure, a wake-up PDCCH is monitored. If detecting the wake-up PDCCH, or if obtaining wake-up indication information from DCI transmitted by the wake-up PDCCH, the UE is controlled to enter the wake-up mode. On one hand, user power consumption in scenarios where no data is scheduled may be reduced; on the other hand, using PDCCH to instruct UEs to enter the wake-up mode may save time and frequency resources.

In some embodiments, if not detecting the wake-up PDCCH, the UE may be woken up (that is, enter the wake-up mode), so that the UE can still be scheduled in case of PDCCH miss detection.

In some embodiments, if not detecting the wake-up PDCCH, the UE may not be woken up, so that the probability of the UE failing to act not being woken correspondingly is reduced, which saves power of the UE.

In some embodiments, before S101, in response to receiving from the base station high-layer signaling that does not enable monitoring the wake-up PDCCH, the UE does not perform S101, so that the base station is flexible and instructs UEs without needs of power saving to not enable monitoring of the wake-up PDCCH.

In some embodiments, if a duration of the onDuration-Timer in a DRX cycle is shorter than a preset time threshold, the UE does not monitor the wake-up PDCCH, that is, not perform S101 as shown in FIG. 1. As in a scenario where the duration of the onDurationTimer is shorter than the preset time threshold, the UE has few occasions to monitor the PDCCH during the on duration, the wake-up PDCCH may not be monitored to ensure performance of data transmission.

In some embodiments, the DCI further includes a duration of entering the wake-up mode which is a number of DRX cycles.

In some embodiments, if the duration is the number of DRX cycles, it may or may not include a current DRX cycle. If being informed of not entering the wake-up mode in multiple DRX cycles, the UE may not enter the wake-up mode in multiple subsequent DRX cycles.

In some embodiments, S101 as shown in FIG. 1 may include: monitoring a PDCCH in a common search space, and descrambling the monitored PDCCH using a new RNTI; and if the descrambling succeeds, determining that the wake-up PDCCH is detected.

The new RNTI in the embodiments refer to an RNTI that is different from an RNTI in an original communication system.

In some embodiments, the UE may monitor the PDCCH in the common search space and determine whether it is a wake-up PDCCH. The monitoring may include: using a new RNTI to descramble the PDCCH, and if the descrambling is successful, determining that the PDCCH is a wake-up PDCCH. The new RNTI refers to an RNTI different from an original RNTI to distinguish the wake-up PDCCH from the original PDCCH.

In some embodiments, a size of the DCI may be 56 bits.

Specifically, said descrambling of the PDCCH may include performing CRC descrambling on the PDCCH.

Further, the wake-up indication information includes a bit corresponding to a position of the UE on a bitmap, or an identity of the UE that needs to enter the wake-up mode.

In some embodiments, the wake-up indication information may be carried in the DCI in the form of a bitmap, and the UE may determine whether the UE enters a wake-up mode by checking a value of the corresponding bit in the bitmap. For example, if the bit value is 0, the UE is not woken up, and when the bit value is 1, the UE is woken up. A number of bits of the wake-up indication information (i.e., the bitmap) is configured by high-layer signaling, such as RRC signaling, and selected from a group consisting of 30 and 56 so as to be the same as a size of the DCI, which enables efficient use of the size of the DCI. In some embodiments, the number of bits of the wake-up indication information is selected from a group consisting of 16 and 32.

Alternatively, the wake-up indication information may be carried in the DCI in the form of an identity list of the UE, and the identity list includes the identity of at least one UE that needs to be woken up. The UE determines whether to enter the wake-up mode by checking whether its own identity exists in the identity list.

Further, the identity of the UE is an index or a number of the UE.

In some embodiments, the DCI format of the wake-up PDCCH is a DCI format used to schedule a PDSCH.

In some embodiments, the DCI format of the wake-up PDCCH may be an original DCI format, for example, the DCI format used to schedule the PDSCH. Further, the UE can use the original DCI format to analyze the DCI of the wake-up PDCCH to avoid increase of the number of times of blind detection caused by changing a size of the DCI.

Further, the DCI format used to schedule PDSCH includes the DCI format used for scheduling a non-broadcast PDSCH. Specifically, the size of the DCI is 56 bits.

In some embodiments, the UE may use the DCI format for scheduling the non-broadcast PDSCH to analyze the DCI of the wake-up PDCCH, so that the UE does not need to monitor the DCI format for scheduling non-broadcast PDSCH in a connected state.

In some embodiments, the DCI format used for scheduling PDSCH includes a DCI format used for scheduling a broadcast PDSCH. Specifically, a size of the DCI is 30 bits.

In some embodiments, the base station enables monitoring of the wake-up PDCCH via high-layer signaling. That is, the UE performs S101 and S102 as shown in FIG. 1 in response to receiving from the base station the high-layer signaling which enables the monitoring of the wake-up PDCCH; or else, S101 and S102 may not be performed.

In some embodiments, the method further includes: if determining to enter the wake-up mode, the UE entering the wake-up mode after a configuration start time.

The configuration start time is a start time position of the UE entering the wake-up mode, and may be preconfigured by the base station.

In some embodiments, the UE determines the configuration start time based on high-layer signaling or the DCI.

In some embodiments, the UE determines the configuration start time based on an index of the configuration start time which is indicated by the DCI, where the index of the configuration start time is an index or number of a plurality of candidate start times configured by high-level signaling.

Figure 2:
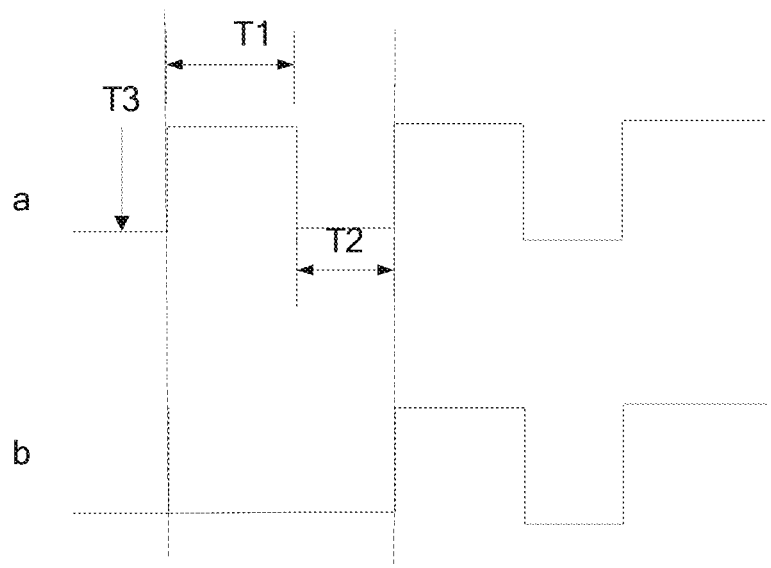
FIG. 2 is a diagram of an application scenario according to an embodiment.

In an application scenario, referring to FIG. 2, the base station configures a semi-static DRX cycle for the UE in a connected state, where the UE starts an onDurationTimer at the beginning of the DRX cycle (i.e., the default start time of the onDurationTimer). Length of the onDurationTimer is T1 as shown in FIG. 2, which is, for example, 80 ms, and length of time remaining in the DRX cycle is T2 as shown in FIG. 2, which is, for example, 80 ms.

Those skilled in the art could understand that a duration of the DRX cycle may be adaptively configured, which is not limited in the embodiments of the present disclosure.

In some scenarios, the UE is in a narrowband system. The UE may monitor the wake-up PDCCH at a time point T3 before the beginning of the current DRX cycle (shown by the dotted line in FIG. 2). For example, the UE detects the wake-up PDCCH at the 20th ms before the default start time of the onDurationTimer, and obtains wake-up indication information indicating the UE to enter the wake-up mode.

Therefore, in the onDurationTimer, that is, in T1 as shown in FIG. 2, the UE monitors the PDCCH. In this case, an on duration of the UE in the current DRX cycle is shown as 'a' in FIG. 2.

To the contrary, if not detecting the wake-up PDCCH at a preset time point T3 outside the active time (or detecting the wake-up PDCCH, and the wake-up indication information in the DCI transmitted by the wake-up PDCCH not indicating to enter the wake-up mode), the UE does not monitor the PDCCH (also be referred to as entering a sleep mode) in T1 as shown in FIG. 2. In this case, the on duration of the UE in the current DRX cycle is shown as 'b' in FIG. 2.

Figure 3:
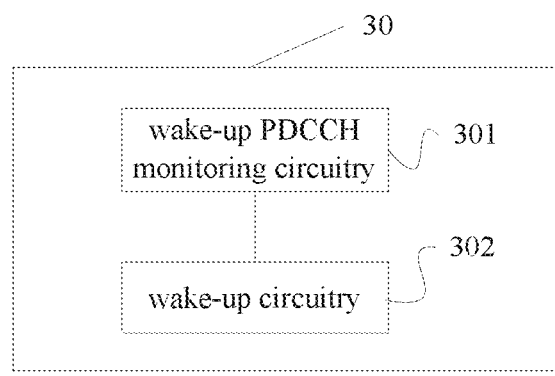
FIG. 3 is a structural diagram of a wake-up apparatus according to an embodiment.

Referring to FIG. 3, FIG. 3 is a structural diagram of a wake-up apparatus 30 according to an embodiment. The apparatus 30 includes a wake-up PDCCH monitoring circuitry 301 and a wake-up circuitry 302.

The wake-up PDCCH monitoring circuitry 301 is configured to monitor a wake-up PDCCH. The wake-up circuitry 302 is configured to: if detecting the wake-up PDCCH, determine to enter a wake-up mode; or if detecting the wake-up PDCCH, and wake-up indication information in DCI transmitted by the wake-up PDCCH indicates to enter the wake-up mode, determine to enter the wake-up mode, wherein entering the wake-up mode includes starting an onDurationTimer and/or starting a drx-InactivityTimer.

In embodiments of the present disclosure, a wake-up PDCCH is monitored. If detecting the wake-up PDCCH, or if obtaining wake-up indication information from DCI transmitted by the wake-up PDCCH, the UE is controlled to enter the wake-up mode. On one hand, user power consumption in scenarios where no data is scheduled may be reduced; on the other hand, using PDCCH to instruct UEs to enter the wake-up mode may save time and frequency resources.

More details of working principles and working modes of the apparatus 30 can be found in the above descriptions of FIG. 1, and are not described here.

In an embodiment of the present disclosure, a storage medium having computer instructions stored therein is provided, wherein when the computer instructions are executed, the method as shown in FIG. 1 is performed. The storage medium may include a Read Only Memory (ROM), a Random Access Memory (RAM), a magnetic disk or an optical disk. In some embodiments, the storage medium may be a computer readable storage medium, such as a non-volatile memory or a non-transitory memory.

In an embodiment of the present disclosure, a UE including a memory and a processor is provided, wherein the memory has computer instructions stored therein, and when the processor executes the computer instructions, the method as shown in FIG. 1 is performed. The UE may include but not limited to terminal devices such as mobile phones, computers or tablets.

A UE in the embodiments of the present disclosure may refer to various forms of access terminal, user unit, user station, Mobile Station (MS), remote station, remote terminal, mobile equipment, user terminal, terminal equipment, wireless communication equipment, user agent or user device. The UE may further be a cellular phone, a cordless phone, a Session Initiation Protocol (SIP) phone, a Wireless Local Loop (WLL) station, a Personal Digital Assistant (PDA), a handheld device with a wireless communication function, a computing device or other processing devices connected to a wireless modems, an in-vehicle device, a wearable device, a terminal equipment in the future 5G network, or a terminal equipment in a future evolved Public Land Mobile Network (PLMN), which is not limited in the embodiments of the present disclosure.

A base station (BS) in the embodiments of the present disclosure may also be referred to as a base station equipment, and is a device deployed in a Radio Access Network (RAN) to provide radio communication functions. For example, an equipment that provides a base station function in a 2G network includes a Base Transceiver Station (BTS) and a Base Station Controller (BSC). An equipment that provides the base station function in a 3G network includes a Node B and a Radio Network Controller (RNC). An equipment that provides the base station function in a 4G network includes an evolved node B (eNB). In a Wireless Local Area Network (WLAN), an equipment that provides the base station function is an Access Point (AP). An equipment that provides the base station function in a 5G New Radio (NR) includes gNB and a continuously evolved Node B (ng-eNB), where gNB and the terminal use NR technology for communication, ng-eNB and the terminal use Evolved Universal Terrestrial Radio Access (E-UTRA) technology for communication, and both gNB and ng-eNB can be connected to a 5G core network. And the base station also refers to an equipment that provides the base station function in a new communication system in the future.

It should be understood that the term "and/or" in the present disclosure is merely an association relationship describing associated objects, indicating that there can be three types of relationships, for example, A and/or B can represent "A exists only, both A and B exist, B exists only. In addition, the character "/" in the present disclosure represents that the former and latter associated objects have an "or" relationship.

The "plurality" in the embodiments of the present disclosure refers to two or more.

In the embodiments of the present disclosure, the processor may be a Central Processing Unit (CPU), or other general processors, Digital Signal Processors (DSPs), Application Specific Integrated Circuits (ASICs), Field Programmable Gate Arrays (FPGAs) or other Programmable logic devices, discrete gates or transistor logic devices, discrete hardware components, and the like. A general processor may be a microprocessor or the processor may be any conventional processor or the like.

It should also be understood that the memory in the embodiments of the present disclosure may be either volatile memory or nonvolatile memory, or may include both volatile and nonvolatile memories. The non-volatile memory may be a Read-Only Memory (ROM), a Programmable ROM (PROM), an Erasable PROM (EPROM), an electrically Erasable EPROM (EEPROM), or a flash memory. The volatile memory may be a Random Access Memory (RAM)

which functions as an external cache. By way of example but not limitation, various forms of RAM are available, such as Static Random Access Memory (SRAM), Dynamic Random Access Memory (DRAM), Synchronous Dynamic Random Access Memory (SDRAM), Double Data Rate Synchronous Dynamic Random Access Memory (DDR SDRAM), Enhanced SDRAM (ESDRAM), Synchronous connection to DRAM (SLDRAM), and Direct Rambus RAM (DR-RAM).

The above embodiments may be implemented in whole or in part by software, hardware, firmware or any combination thereof. When implemented in software, the above embodiments may be implemented in whole or in part in the form of a computer program product. The computer program product includes one or more computer instructions or computer programs. The procedures or functions according to the embodiments of the present disclosure are wholly or partially generated when the computer instructions or the computer programs are loaded or executed on a computer. The computer may be a general purpose computer, a special purpose computer, a computer network, or other programmable device. The computer instructions may be stored in a computer readable storage medium or transmitted from one computer readable storage medium to another computer readable storage medium, for example, the computer instructions may be transmitted from one website, computer, server or data center to another website, computer, server or data center by wire (e.g., infrared, wireless, microwave and etc.). The computer readable storage medium may be any available medium that can be accessed by a computer or a data storage device such as a server or a data center that contains one or more sets of available media. The available medium may be a magnetic medium (e.g., floppy disk, hard disk or magnetic tape), an optical medium (e.g., DVD), or a semiconductor medium. The semiconductor medium may be a solid disk.

It should be understood that, in the various embodiments of the present disclosure, sequence numbers of the above-mentioned processes do not represent an execution sequence, and the execution sequence of each process should be determined by its function and inherent logic, which does not limit an implementation process of the embodiments of the present disclosure.

In the above embodiments of the present disclosure, it should be understood that the disclosed method, device and system may be implemented in other ways. For example, the above device embodiments are merely illustrative, and for example, division of units is merely one logical division, and other divisions may be realized in practice, for example, a plurality of units or components may be combined or integrated into another system, or some features may be omitted, or not executed. Further, the shown or discussed mutual coupling or direct coupling or communication connection may be an indirect coupling or communication connection via some interfaces, devices or units, and may be in an electrical, mechanical or other form.

The units described as separate parts may or may not be physically separate, and parts shown as units may or may not be physical units, that is, may be disposed in one place, or may be distributed on a plurality of network units. Some or all of the units can be selected according to practical requirements to achieve the purpose of the solutions of the embodiments.

In addition, functional units in the embodiments of the present disclosure may be integrated in one processing unit, or each unit may be physically separate, or two or more units may be integrated in one unit. The integrated units can be realized in a form of hardware, or in a form of hardware plus a software functional unit.

The integrated units implemented in the form of the software functional unit may be stored in a computer readable storage medium. The software functional unit is stored in a storage medium and includes several instructions for causing a computer device (a personal computer, a server or a network device) to execute some steps of the methods in the embodiments of the present disclosure. And the storage medium may be a medium for storing program codes, such as a U disk, a removable hard disk, a ROM, a RAM, a magnetic disk or an optical disk.

Although the present disclosure has been disclosed above with reference to preferred embodiments thereof, it should be understood that the disclosure is presented by way of example only, and not limitation. Those skilled in the art can modify and vary the embodiments without departing from the spirit d scope of the present disclosure.

What is claimed is:

1. A wake-up method, comprising:
   monitoring a wake-up Physical Downlink Control Channel (PDCCH);
   if detecting the wake-up PDCCH, determining to enter a wake-up mode; or
   if detecting the wake-up PDCCH, and wake-up indication information in Downlink Control Information (DCI) transmitted by the wake-up PDCCH indicates to enter the wake-up mode, determining to enter the wake-up mode, wherein entering the wake-up mode comprises starting an onDurationTimer;
   wherein said monitoring the wake-up PDCCH comprises: monitoring the wake-up PDCCH outside active time and before a start time of the onDurationTimer;
   wherein the start time of the onDurationTimer is a frame number or a subframe number at which the onDurationTimer is started.

2. The method according to claim 1, wherein said monitoring the wake-up PDCCH before a start time of the onDurationTimer comprises:
   monitoring the wake-up PDCCH on a frame or a subframe that has an offset of X subframes or X frames from the start time of the onDurationTimer, wherein X is an integer.

3. The method according to claim 2, wherein the offset of X subframes or X frames is configured via high-layer signaling.

4. The method according to claim 1, wherein resource configuration for the wake-up PDCCH is determined via high-layer signaling, and comprises at least one of a start carrier index, a number of carrier bundlings, or a number of repetitions.

5. The method according to claim 3, wherein said monitoring the wake-up PDCCH comprises:
   monitoring a PDCCH in a common search space, and descrambling the monitored PDCCH using a new Radio Network Temporary Identity (RNTI); and
   if the descrambling succeeds, determining that the wake-up PDCCH is detected.

6. The method according to claim 1, wherein said determining to enter a wake-up mode comprises:
   if detecting the wake-up PDCCH, detecting a bit in a corresponding position in the wake-up indication information to determine to enter the wake-up mode.

7. The method according to claim 6, wherein a number of bits of the wake-up indication information is configured via a high-layer signaling, and is 30 or 56.

8. The method according to claim 1, wherein the wake-up indication information comprises an identity of a User Equipment (UE) to enter the wake-up mode.

9. The method according to claim 1, wherein a DCI format of the wake-up PDCCH is a DCI format used to schedule a Physical Downlink Shared Channel (PDSCH).

10. The method according to claim 1, wherein a base station enables monitoring of the wake-up PDCCH via high-layer signaling.

11. The method according to claim 1, further comprising:
if not detecting the wake-up PDCCH, determining to enter the wake-up mode.

12. The method according to claim 1, further comprising:
if determining to enter the wake-up mode, entering the wake-up mode after a configuration start time.

13. The method according to claim 12, wherein the configuration start time is a number of subframes or slots.

14. The method according to claim 12, wherein the configuration start time is determined via high-layer signaling.

15. The method according to claim 12, wherein the configuration start time is determined via the DCI.

16. The method according to claim 15, wherein the configuration start time is determined by an index of the configuration start time which is indicated by the DCI, wherein the index of the configuration start time is an index or number of a plurality of candidate start times configured by high-level signaling.

17. A non-transitory storage medium storing one or more programs, the one or more programs comprising computer instructions, which, when executed by a processor, cause the processor to:
monitor a wake-up Physical Downlink Control Channel (PDCCH);
if the wake-up PDCCH is detected, determine to enter a wake-up mode; or
if the wake-up PDCCH is detected, and wake-up indication information in Downlink Control Information (DCI) transmitted by the wake-up PDCCH indicates to enter the wake-up mode, determine to enter the wake-up mode, wherein entering the wake-up mode comprises starting an onDurationTimer;
wherein said monitoring the wake-up PDCCH comprises:
monitoring the wake-up PDCCH outside active time and before a start time of the onDurationTimer;
wherein the start time of the onDurationTimer is a frame number or a subframe number at which the onDurationTimer is started.

18. A user equipment comprising a memory and a processor, wherein the memory stores one or more programs, the one or more programs comprising computer instructions, which, when executed by the processor, cause the processor to:
monitor a wake-up Physical Downlink Control Channel (PDCCH);
if the wake-up PDCCH is detected, determine to enter a wake-up mode; or
if the wake-up PDCCH is detected, and wake-up indication information in Downlink Control Information (DCI) transmitted by the wake-up PDCCH indicates to enter the wake-up mode, determine to enter the wake-up mode, wherein entering the wake-up mode comprises starting an onDurationTimer;
wherein said monitoring the wake-up PDCCH comprises:
monitoring the wake-up PDCCH outside active time and before a start time of the onDurationTimer;
wherein the start time of the onDurationTimer is a frame number or a subframe number at which the onDurationTimer is started.

* * * * *